United States Patent
Huang et al.

(10) Patent No.: US 9,977,221 B2
(45) Date of Patent: May 22, 2018

(54) INTERACTIVE LENS ASSEMBLY

(71) Applicant: ZHEJIANG SUNNY OPTICS CO., LTD., Ningbo, Zhejiang (CN)

(72) Inventors: Lin Huang, Zhejiang (CN); Fujian Dai, Zhejiang (CN)

(73) Assignee: ZHEJIANG SUNNY OPTICS CO., LTD., Ningbo, Zhejian (CN)

( * ) Notice: Subject to any disclaimer, the term of this patent is extended or adjusted under 35 U.S.C. 154(b) by 0 days. days.

(21) Appl. No.: 15/504,568

(22) PCT Filed: Oct. 28, 2015

(86) PCT No.: PCT/CN2015/093121
§ 371 (c)(1),
(2) Date: Feb. 16, 2017

(87) PCT Pub. No.: WO2016/161798
PCT Pub. Date: Oct. 13, 2016

(65) Prior Publication Data
US 2017/0235101 A1    Aug. 17, 2017

(30) Foreign Application Priority Data
Apr. 8, 2015 (CN) .......................... 2015 1 0163715

(51) Int. Cl.
*G02B 13/00* (2006.01)
*G02B 9/12* (2006.01)
(Continued)

(52) U.S. Cl.
CPC ........... *G02B 13/0035* (2013.01); *G02B 5/20* (2013.01); *G02B 9/12* (2013.01); *G02B 9/16* (2013.01); *G02B 13/04* (2013.01); *G02B 13/14* (2013.01)

(58) Field of Classification Search
CPC ........ G02B 13/0035; G02B 5/20; G02B 9/12; G02B 9/16; G02B 13/04; G02B 13/14
(Continued)

(56) References Cited

U.S. PATENT DOCUMENTS 7,436,605 B2 * 10/2008 Asami ....................... G02B 9/12
                                                                        359/716
7,495,845 B2 *  2/2009 Asami ....................... G02B 9/12
                                                                        359/749
(Continued)

FOREIGN PATENT DOCUMENTS

CN           103777315 A      5/2014

OTHER PUBLICATIONS

Office action from EPO for EP application 15843077.

*Primary Examiner* — Bumsuk Won
*Assistant Examiner* — Grant Gagnon
(74) *Attorney, Agent, or Firm* — Kile Park Reed & Houtteman PLLC

(57) ABSTRACT

Provided is an interactive lens assembly, including first lens, a second lens, an aperture stop, a third lens and a filter from an object side of the interactive lens assembly to an image side of the interactive lens assembly in turn. The first lens is of a negative focal power, an image side surface of the first lens is concave; the second lens is of a focal power; the third lens is of a positive focal power, an image side surface of the third lens is convex, and each of the first lens, the second lens and the third lens is made of a plastic material; the interactive lens assembly meets the following formulas: (CT1+CT2)/CT3<0.9; and ImgH/(f*TTL)≥0.4 mm$^{-1}$.

16 Claims, 9 Drawing Sheets

(51) Int. Cl.
*G02B 5/20* (2006.01)
*G02B 9/16* (2006.01)
*G02B 13/04* (2006.01)
*G02B 13/14* (2006.01)

(58) Field of Classification Search
USPC .......................................................... 359/784
See application file for complete search history.

(56) References Cited

U.S. PATENT DOCUMENTS 7,843,652 B2 * 11/2010 Asami ...................... G02B 9/12
359/716
2006/0171042 A1 * 8/2006 Hirose ..................... G02B 9/12
359/753

* cited by examiner

INTERACTIVE LENS ASSEMBLY

CROSS-REFERENCE TO RELATED APPLICATION

The application is the U.S. national phase of PCT Application No. PCT/CN2015/093121filed on Oct. 28, 2015, which claims a priority to and benefits of Chinese Patent Applications No. 201510163715.3, filed with the State Intellectual Property Office of P. R. China on Apr. 8, 2015, the entire content of which are incorporated herein by reference.

FIELD

The present disclosure relates to an imaging technology, and more particularly to an interactive lens assembly.

BACKGROUND

With the development of the times and the progress of science and technology, an interactive lens assembly has been applied in a wider and wider range, especially in gesture recognition, eye tracking, face recognition and electronic entertainment industries, etc. Besides, a near-infrared interactive lens assembly can identify information in a better way, thus excluding the impact of stray light. Thus, the demand on the near-infrared interactive lens assembly is also getting higher and higher. Therefore, an interactive lens assembly only used for receiving visible light has been unable to meet the requirements.

In addition, the interactive lens assembly develops gradually towards miniaturization, lightweight and high imaging quality, however, miniaturization design is often impeded when the interactive lens assembly takes a feature of wide-angle into account, and imaging quality also needs to be improved. Furthermore, in order to improve the imaging quality, a glass lens is often used, which increases the manufacturing cost of the interactive lens assembly.

SUMMARY

Embodiments of the present disclosure seek to solve at least one of the problems existing in the related art.

The interactive lens assembly according to embodiments of the present disclosure, includes a first lens, a second lens, an aperture stop, a third lens and a filter from an object side of the interactive lens assembly to an image side of the interactive lens assembly in turn, wherein the first lens is of a negative focal power, an image side surface of the first lens is concave;

the second lens is of a focal power;

the third lens is of a positive focal power, an image side surface of the third lens is convex, wherein each of the first lens, the second lens and the third lens is made of a plastic material, the interactive lens assembly meets the following formulas:

$(CT1+CT2)/CT3<0.9$; and $ImgH/(f*TTL) \geq 0.4$ mm$^{-1}$, wherein CT1 represents a central thickness of the first lens, CT2 represents a central thickness of the second lens, CT3 represents a central thickness of the third lens, ImgH represents half of a length of an effective pixel region diagonal of the interactive lens assembly at an imaging surface, f represents an effective focal length of the interactive lens assembly, and TTL represents a full length of the interactive lens assembly.

In some embodiments, the filter is a band pass filter, and a band pass wavelength is between a wavelength of light source used ±15 nm and the wavelength of light source used ±50 nm.

In some embodiments, the interactive lens assembly meets the following formula:

$HFOV>65°$, wherein HFOV represents half of a maximum field angle of the interactive lens assembly.

In some embodiments, the interactive lens assembly meets the following formulas:

$-1.3<R2/R6<-0.7$; and $-0.8<SAG32/SD32<-0.4$, wherein R2 represents a curvature radius of the image side surface of the first lens, R6 represents a curvature radius of the image side surface of the third lens, SAG32 represents a vector height of the image side surface of the third lens, and SD32 represents a maximum effective radius of the image side surface of the third lens.

In some embodiments, the interactive lens assembly meets the following formula:

$-2.6<f12/f3<-0.7$, wherein f12 represents a combined focal length of the first lens and the second lens, and f3 represents a focal length of the third lens.

In some embodiments, the interactive lens assembly meets the following formula:

$-3.5<f1/f<-1$, wherein f1 represents a focal length of the first lens.

In some embodiments, the interactive lens assembly meets the following formula:

$0.2<(T12+T23)/Dr1r6<0.6$, wherein T12 represents a distance between the first lens and the second lens along an optic axis, T23 represents a distance between the second lens and the third lens along the optic axis, Dr1r6 represents a distance from an object side surface of the first lens to the image side surface of the third lens.

In some embodiments, an object side surface of the first lens is convex.

In some embodiments, the second lens is of a positive focal power, an object side surface of the second lens is convex, and an image side surface of the second lens is concave.

In some embodiments, an object side surface of the third lens is convex.

Meeting requirements of the above conditions is beneficial to the miniaturization and the wide-angle characteristic of the interactive lens assembly, and the interactive lens assembly has a larger field angle.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
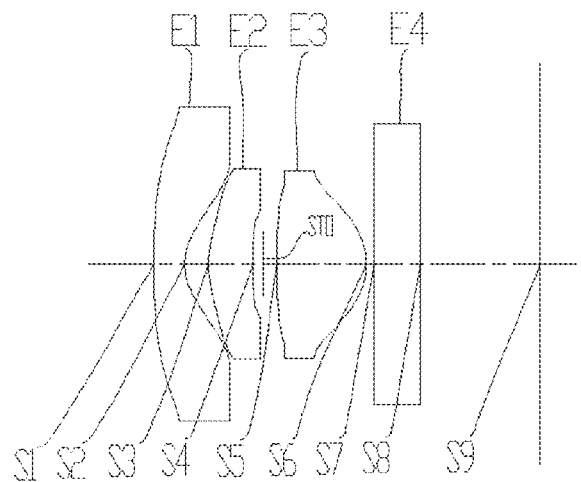
FIG. 1 is a schematic view showing an interactive lens assembly according to Embodiment 1 of the present disclosure.
Figure 2:
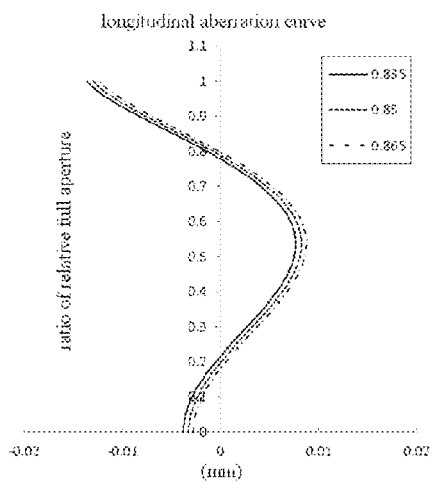
FIG. 2 is a diagram showing a longitudinal aberration curve (mm) of the interactive lens assembly in Embodiment 1.
Figure 3:
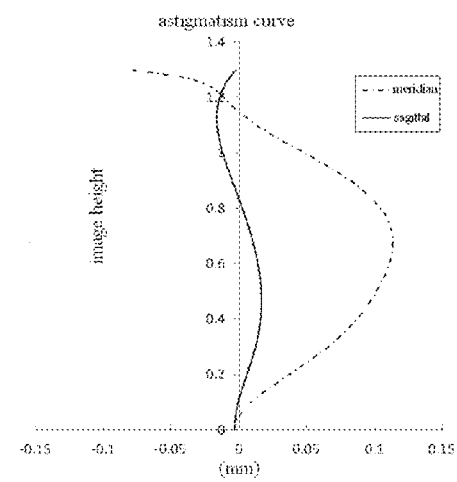
FIG. 3 is a diagram showing an astigmatism curve (mm) of the interactive lens assembly in Embodiment 1.
Figure 4:
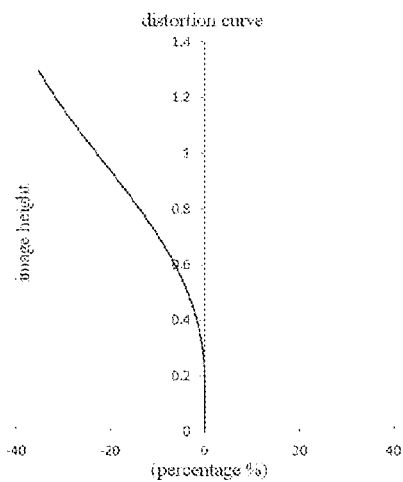
FIG. 4 is a diagram showing a distortion curve (%) of the interactive lens assembly in Embodiment 1.
Figure 5:
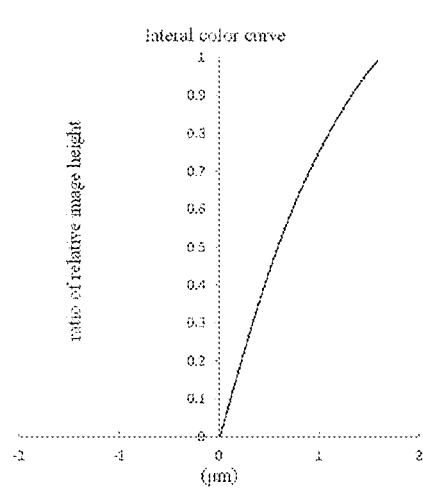
FIG. 5 is a diagram showing a lateral color curve (μm) of the interactive lens assembly in Embodiment 1; ratio of relative image height

Embodiments of the present disclosure will be described in detail in the following descriptions, examples of which are shown in the accompanying drawings, in which the same or similar reference numerals represent the same or similar elements or elements having the same or similar functions throughout the descriptions. The embodiments described hereinafter with reference to the accompanying drawings are explanatory and illustrative, which are used to generally understand the present disclosure, but shall not be construed to limit the present invention.

In the description of the present disclosure, it shall be appreciated that, terms "first", "second" are just used herein for purposes of description and are not intended to indicate or imply relative importance or significance or to imply the number of indicated technical features. Thus, the feature defined with "first" and "second" may explicitly or implicitly comprise one or more this feature. In the description of the present disclosure, unless specified otherwise, "a plurality of" means two or more than two.

In the description of the present disclosure, it should be noted that, unless otherwise clearly defined and limited, the terms "mounted," "connected", "connection" should be broadly understood, and may be, for example, fixed connections, detachable connections, or integral connections; may also be electrical connections or may communicate with each other; may also be direct connections or indirect connections via intermediation; may also be inner communications or interaction relationship of two elements, which can be understood by those ordinary skilled in the art according to specific situations.

Various embodiments and examples are provided in the following descriptions to implement different structures of the present disclosure. In order to simplify the present disclosure, certain elements and settings will be described. However, these elements and settings are only by way of example and are not intended to limit the present disclosure. In addition, reference numerals and/or reference letters may be repeated in different examples in the present disclosure, this repeating is for the purpose of simplification and clarity and does not refer to relations between different embodiments and/or settings. Furthermore, examples of specific processes and materials are provided in the present disclosure, however, it would be appreciated by those ordinary skilled in the art that other processes and/or materials may be also applied.

With reference to FIG. 1, an interactive lens assembly according to an embodiment of the present disclosure includes a first lens E1 having a negative focal power, a second lens E2 having a focal power, an aperture stop STO, a third lens E3 having a positive focal power and a filter E4 from an object side of the interactive lens assembly to an image side of the interactive lens assembly in turn. The first lens E1 includes an object side surface S1 and an image side surface S2, the second lens E2 includes an object side surface S3 and an image side surface S4, the third lens E3 includes an object side surface S5 and an image side surface S6, and the filter E4 includes an object side surface S7 and an image side surface S8. The image side surface S2 is concave, while the image side surface S6 is convex.

Figure 41:
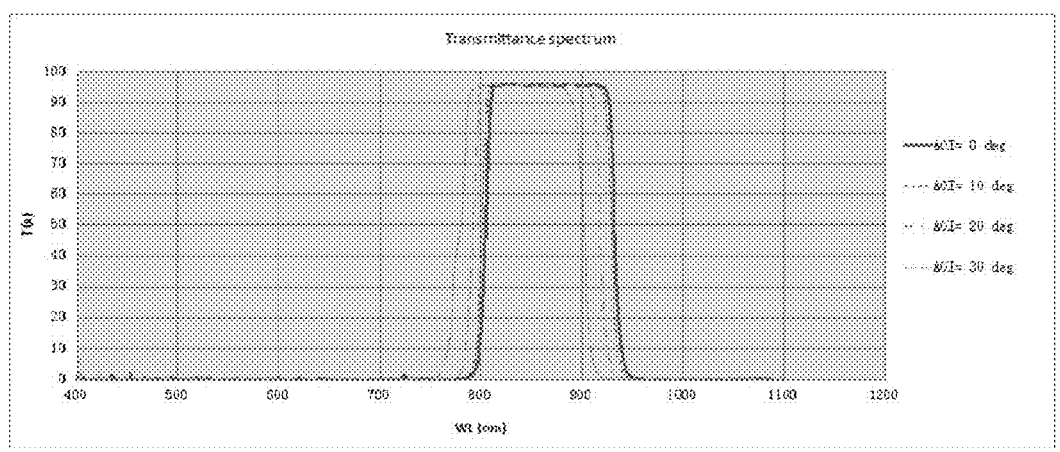
FIG. 41 is a diagram showing a color filter transmittance spectrum.

Through a coating film, the filter E4 can selectively allow light needed to pass through, and filter out other unwanted light, so as to not affect information acquisition, thus avoiding adversely affecting the imaging quality. The wavelength of the light passing through the filter is between a wavelength of light source used ±15 nm and the wavelength of light source used ±50 nm. With reference to FIG. 41, when the interactive lens assembly is used in near infrared, the wavelength of the light source used is 850 nm, the filter allows corresponding light within the near infrared wave band to pass through, the wavelength of the light passing through the interactive lens assembly is 800-900 nm, and light within other wave band is filtered out, so as to reduce interference. Similarly, the filter can also allow the light within other wave band to pass through by coating. With different light sources, resulting in different wavelengths and different band pass wavelengths, FIG. 41 is merely taken as an example for illustration. In this embodiment, the interactive lens assembly is designed for near-infrared, and thus may have a better interactive recognition effect within the near-infrared wave band.

The first lens E1, the second lens E2 and the third lens E3 of the interactive lens assembly are each made of a plastic material, which reduces material cost and processing difficulty as compared with made of glass, thereby reducing overall cost of the interactive lens assembly.

The interactive lens assembly meets the following formulas:

$$(CT1+CT2)/CT3<0.9; \text{ and}$$

$$ImgH/(f*TTL)>0.4 \text{ mm}^{-1},$$

in which CT1 represents a central thickness of the first lens E1, CT2 represents a central thickness of the second lens E2, CT3 represents a central thickness of the third lens E3, ImgH represents half of a length of an effective pixel region diagonal of the interactive lens assembly at an imaging surface S9, f represents an effective focal length of the interactive lens assembly, and TTL represents a full length of the interactive lens assembly.

Meeting requirements of the above conditions is beneficial to the miniaturization and the wide-angle characteristic of the interactive lens assembly, and the interactive lens assembly has a larger field angle In some embodiments, the interactive lens assembly meets the following formula:

$$HFOV>65°,$$

in which HFOV represents half of a maximum field angle of the interactive lens assembly.

Meeting requirements of the above formula may guarantee the wide-angle characteristic of the interactive lens assembly.

In some embodiments, the interactive lens assembly meets the following formulas:

$$-1.3<R2/R6<-0.7; \text{ and}$$

$$-0.8<SAG32/SD32<-0.4,$$

in which R2 represents a curvature radius of the image side surface S2, R6 represents a curvature radius of the image side surface S6, SAG32 represents a vector height of the image side surface S6, and SD32 represents a maximum effective radius of the image side surface S6.

The limitation to the above formulas for the curvature radius and shapes of the first lens E1 and the third lens E3 is beneficial to enhance the imaging quality and the wide-angle characteristic, reduce an angle formed by the light incident on the imaging surface S9, and reduce the possibility of generating a dark corner.

In some embodiments, the interactive lens assembly meets the following formula:

$$-2.6<f12/f3<-0.7,$$

in which f12 represents a combined focal length of the first lens E1 and the second lens E2, and f3 represents a focal length of the third lens E3.

Meeting requirement to the above formula is beneficial to the imaging quality and the wide-angle characteristic of the interactive lens assembly.

In some embodiments, the interactive lens assembly meets the following formula:

$$-3.5<f1/f<-1,$$

in which f1 represents a focal length of the first lens E1.

The above limitation to the focal length of the first lens E1 is beneficial to the wide-angle characteristic of the interactive lens assembly.

In some embodiments, the interactive lens assembly meets the following formula:

$$0.2<(T12+T23)/Dr1r6<0.6,$$

in which T12 represents a distance between the first lens E1 and the second lens E2 along an optic axis, T23 represents a distance between the second lens E2 and the third lens E3 along the optic axis, and Dr1r6 represents a distance from the object side surface S1 to the image side S6.

Meeting requirements to the above conditions is beneficial to the miniaturization of the interactive lens assembly.

In some embodiments, the object side surface S1 of the first lens is convex.

In some embodiments, the second lens E2 is of a positive focal power, the object side surface S3 is convex, and the image side surface S4 is concave.

In some embodiments, the object side surface S5 of the third lens is convex. Meeting requirements to the above shapes is beneficial to the miniaturization and the imaging quality of the interactive lens assembly.

During imaging, after passing through the first lens E1, the second lens E2, the aperture stop STO, the third lens E3 and the filter E4 in turn, the light is imaged at the imaging surface S9.

In some embodiments, each of the first lens E1, the second lens E2 and the third lens E3 is an aspheric shape lens.

A surface shape of the aspheric shape is defined by a formula as follow:

$$x = \frac{ch^2}{1 + \sqrt{1-(k+1)c^2h^2}} + \sum A_i h^i.$$

In which, h represents a height from any point on the aspheric shape to an optical axis, c represents an apex curvature, k represents a cone coefficient, and Ai represents a coefficient for the i-th order of the aspheric.

Embodiment 1

In Embodiment 1, the interactive lens assembly meets the conditions of the following tables:

TABLE 1

| No. of surface | Surface type | Curvature radius | Thickness | Material (Refractive Index/ Abbe number) | Conic coefficient |
|---|---|---|---|---|---|
| obj | spherical | infinity | 400.0000 | | 0.0000 |
| S1 | aspheric | 6.5947 | 0.2082 | 1.54/55.8 | 21.0208 |
| S2 | aspheric | 0.3526 | 0.1551 | | −1.5935 |
| S3 | aspheric | 0.6041 | 0.2854 | 1.54/55.8 | −8.7510 |
| S4 | aspheric | 3.6552 | 0.0666 | | −115.5217 |
| STO | spherical | infinity | 0.0911 | | 0.0000 |
| S5 | aspheric | 7.2437 | 0.5794 | 1.54/55.8 | 5.4632 |
| S6 | aspheric | −0.4173 | 0.0500 | | −2.3632 |
| S7 | spherical | infinity | 0.3000 | 1.52/64.2 | 0.0000 |
| S8 | spherical | infinity | 0.7758 | | 0.0000 |
| S9 | spherical | infinity | | | 0.0000 |

TABLE 2

| No. of surface | A4 | A6 | A8 | A10 | A12 | A14 | A16 |
|---|---|---|---|---|---|---|---|
| S1 | 1.3872E−01 | −5.2689E−02 | 1.8880E−02 | −6.2434E−03 | −1.0525E−02 | −1.4276E−02 | 4.2014E−04 |
| S2 | −4.9357E−01 | −8.3294E−01 | −8.7759E−01 | 2.7068E−01 | 3.8920E+00 | 7.0078E+00 | −1.1395E+01 |
| S3 | −9.2981E−01 | 1.9895E+00 | 3.5598E+00 | 3.3449E+00 | −1.5912E+01 | −3.5016E+01 | 2.0243E+01 |
| S4 | 6.9570E−01 | 3.2525E−01 | 1.6549E+00 | −1.1221E+03 | 5.7476E+02 | 1.4199E+05 | −7.6042E+05 |
| S5 | 2.6405E−01 | 1.8383E+00 | −1.0628E+01 | 2.7775E+01 | 7.3980E+01 | −5.9356E+02 | 9.2404E+02 |
| S6 | −2.2056E+00 | 4.3334E+00 | 2.1754E−01 | 1.8994E+00 | 2.4771E+01 | 2.9119E+01 | −1.9407E+02 |

In addition, f1=−0.71 mm; f2=1.33 mm; f3=0.77 mm; and f=0.67 mm; HFOV=72.0°; Fno: 2.1.

Embodiment 2

Figure 6:
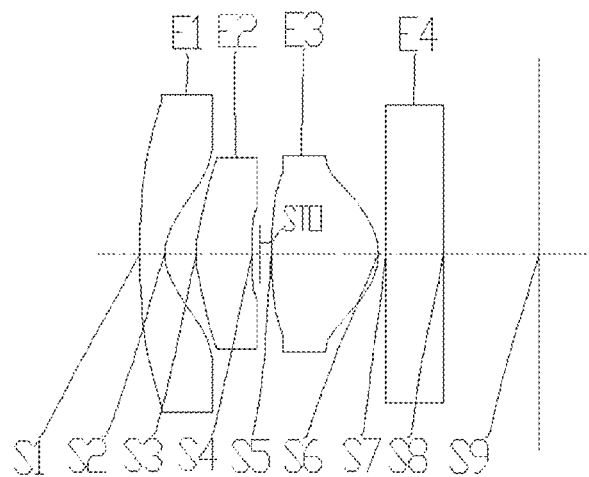
FIG. 6 is a schematic view showing an interactive lens assembly according to Embodiment 2 of the present disclosure.
Figure 7:
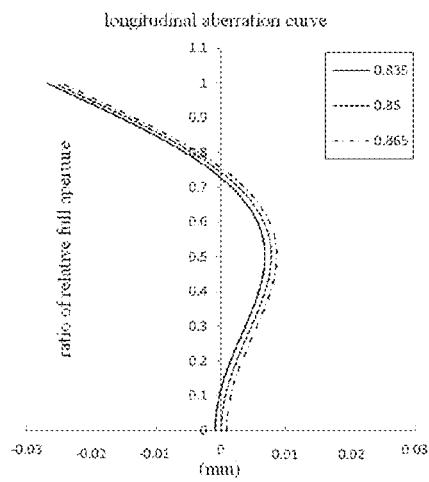
FIG. 7 is a diagram showing a longitudinal aberration curve (mm) of the interactive lens assembly in Embodiment 2.
Figure 8:
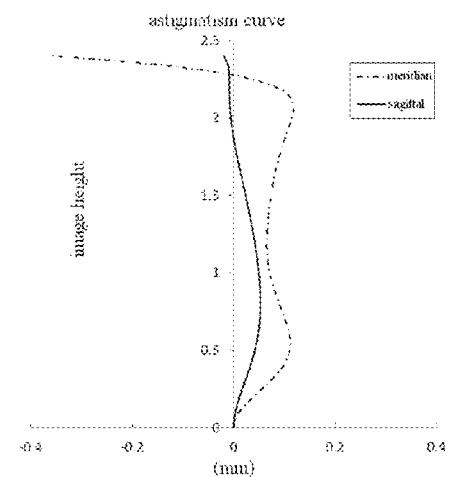
FIG. 8 is a diagram showing an astigmatism curve (mm) of the interactive lens assembly in Embodiment 2.
Figure 9:
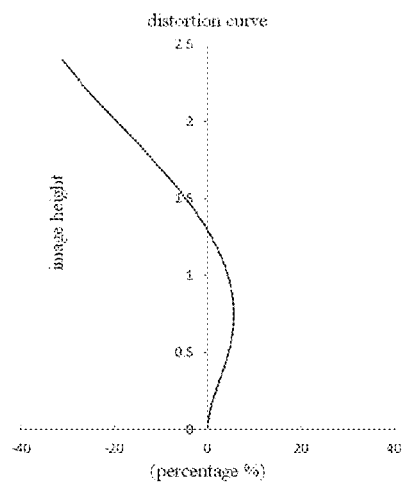
FIG. 9 is a diagram showing a distortion curve (%) of the interactive lens assembly in Embodiment 2.
Figure 10:
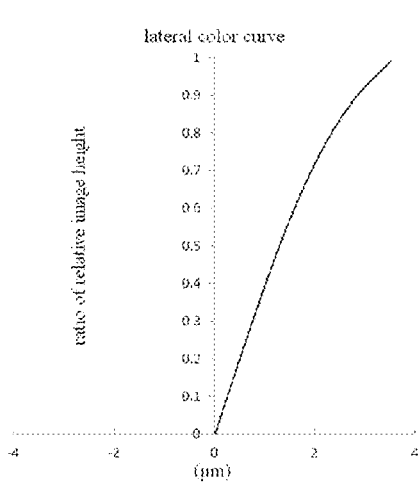
FIG. 10 is a diagram showing a lateral color curve (μm) of the interactive lens assembly in Embodiment 2.

With reference to FIG. 6, in Embodiment 2, the interactive lens assembly meets the conditions of the following tables:

TABLE 3

| No. of surface | Surface type | Curvature radius | Thickness | Material (Refractive Index/Abbe number) | Conic coefficient |
|---|---|---|---|---|---|
| obj | spherical | infinity | 741.1760 | | 0.0000 |
| S1 | aspheric | 13.9647 | 0.2919 | 1.54/55.8 | 4.5546 |
| S2 | aspheric | 0.5937 | 0.3838 | | −1.6754 |
| S3 | aspheric | 1.1718 | 0.6889 | 1.54/55.8 | −7.4014 |
| S4 | aspheric | 6.6143 | 0.0965 | | 37.7432 |
| STO | spherical | infinity | 0.1417 | | 0.0000 |
| S5 | aspheric | 7.0318 | 1.2936 | 1.54/55.8 | 19.2960 |
| S6 | aspheric | −0.7241 | 0.1000 | | −2.4366 |
| S7 | spherical | infinity | 0.7000 | 1.52/64.2 | 0.0000 |
| S8 | spherical | infinity | 1.1525 | | 0.0000 |
| S9 | spherical | infinity | — | | 0.0000 |

TABLE 4

| No. of surface | A4 | A6 | A8 | A10 | A12 | A14 | A16 |
|---|---|---|---|---|---|---|---|
| S1 | 1.8338E−02 | −3.0001E−03 | 3.3565E−04 | −6.9621E−06 | −8.9815E−06 | −3.2674E−06 | 3.5005E−07 |
| S2 | −7.8478E−02 | −3.5255E−02 | −9.6334E−03 | 2.0791E−03 | 4.7721E−03 | 2.5775E−03 | −1.5902E−03 |
| S3 | −1.4106E−01 | 7.1788E−02 | 2.8658E−02 | 7.5018E−03 | −2.2497E−02 | −9.1538E−03 | 8.5873E−03 |

TABLE 4-continued

| No. of surface | A4 | A6 | A8 | A10 | A12 | A14 | A16 |
|---|---|---|---|---|---|---|---|
| S4 | 1.0764E-01 | 7.4656E-02 | 2.5076E+00 | -4.1639E+00 | -1.3541E-01 | 3.9136E+01 | -1.0471E+02 |
| S5 | 5.0769E-02 | 1.0574E-01 | -1.9956E-01 | 1.1618E-01 | 1.1168E-01 | -1.8420E-01 | 6.3682E-02 |
| S6 | -3.4509E-01 | 1.9981E-01 | 3.3764E-03 | 7.4069E-03 | 2.7891E-02 | 9.4699E-03 | -1.8674E-02 |

In addition, f1=-1.18 mm; f2=2.59 mm; f3=1.32 mm; and f=0.99 mm; HFOV=74.1°; Fno: 2.1.

Embodiment 3

Figure 11:
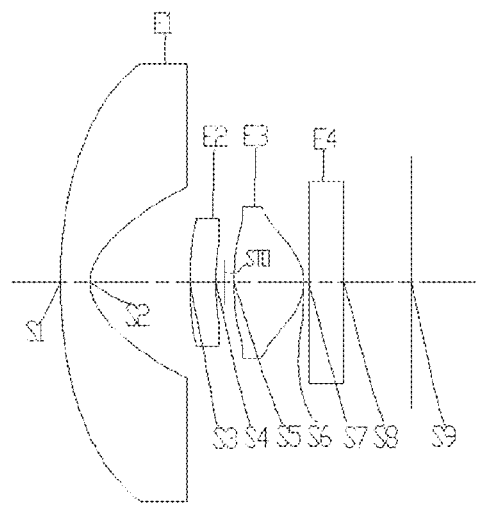
FIG. 11 is a schematic view showing an interactive lens assembly according to Embodiment 3 of the present disclosure.
Figure 12:
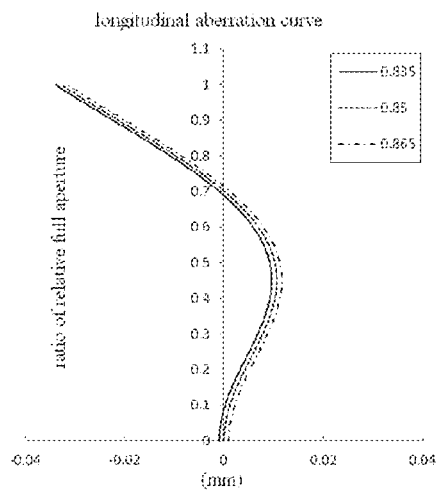
FIG. 12 is a diagram showing a longitudinal aberration curve (mm) of the interactive lens assembly in Embodiment 3.
Figure 13:
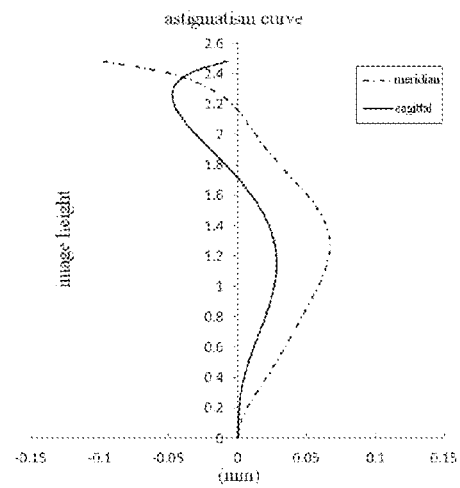
FIG. 13 is a diagram showing an astigmatism curve (mm) of the interactive lens assembly in Embodiment 3.
Figure 14:
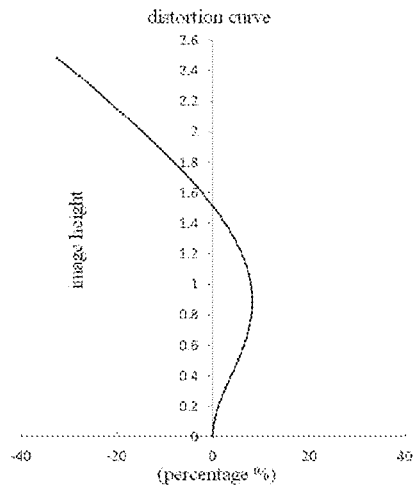
FIG. 14 is a diagram showing a distortion curve (%) of the interactive lens assembly in Embodiment 3.
Figure 15:
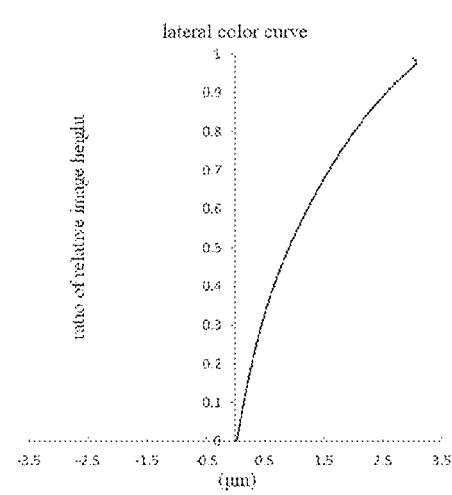
FIG. 15 is a diagram showing a lateral color curve (μm) of the interactive lens assembly in Embodiment 3.

With reference to FIG. 11, in Embodiment 3, the interactive lens assembly meets the conditions of the following tables:

TABLE 5

| No. of surface | Surface type | Curvature radius | Thickness | Material (Refractive Index/Abbe number) | Conic coefficient |
|---|---|---|---|---|---|
| obj | spherical | infinity | infinity | | 0.0000 |
| S1 | aspheric | 9.7089 | 0.5954 | 1.54/55.8 | 3.0830 |
| S2 | aspheric | 0.8552 | 1.9907 | | -1.1379 |
| S3 | aspheric | 3.5535 | 0.5291 | 1.54/55.8 | -119.6600 |
| S4 | aspheric | 8.7688 | 0.1851 | | -130.3521 |
| STO | spherical | infinity | 0.1793 | | 0.0000 |
| S5 | aspheric | 5.0840 | 1.3921 | 1.54/55.8 | -146.2418 |
| S6 | aspheric | -0.9048 | 0.1000 | | -1.0018 |
| S7 | spherical | infinity | 0.7000 | 1.52/64.2 | 0.0000 |
| S8 | spherical | infinity | 1.3313 | | 0.0000 |
| S9 | spherical | infinity | — | | 0.0000 |

TABLE 6

| No. of surface | A4 | A6 | A8 | A10 | A12 | A14 | A16 |
|---|---|---|---|---|---|---|---|
| S1 | 2.5371E-04 | 1.7727E-05 | -7.6199E-08 | -1.6408E-08 | 1.8607E-10 | -1.2266E-11 | 1.8176E-12 |
| S2 | -2.8582E-03 | 1.3808E-03 | 1.5859E-04 | 2.8380E-05 | 1.0113E-05 | 1.0742E-06 | -6.2861E-07 |
| S3 | -1.7084E-02 | 2.3463E-02 | 5.0935E-03 | -2.3525E-03 | -2.6240E-03 | 4.7010E-04 | 2.1779E-04 |
| S4 | -6.9410E-03 | 2.9652E-01 | -9.8178E-02 | -1.1283E-01 | -2.2682E-01 | 2.3329E-01 | 8.8438E-02 |
| S5 | 6.7364E-02 | -2.1183E-02 | -2.4769E-03 | 4.2556E-03 | 6.6084E-04 | 1.6704E-05 | -6.1494E-04 |
| S6 | 2.2604E-02 | 1.6786E-02 | 3.0485E-03 | 2.4483E-03 | 8.0622E-04 | 7.0573E-05 | -4.1357E-04 |

In addition, f1=-1.82 mm; f2=10.94 mm; f3=1.58 mm; and f=0.79 mm; HFOV=78°; Fno: 2.0.

TABLE 7

| No. of surface | Surface type | Curvature radius | Thickness | Material (Refractive Index/Abbe number) | Conic coefficient |
|---|---|---|---|---|---|
| obj | spherical | infinity | infinity | | 0.0000 |
| S1 | aspheric | 7.4891 | 0.4568 | 1.54/55.8 | 3.0890 |
| S2 | aspheric | 0.6527 | 1.5369 | | -1.1382 |
| S3 | aspheric | 2.7754 | 0.4000 | 1.54/55.8 | -121.5668 |
| S4 | aspheric | 6.8842 | 0.1401 | | -109.5873 |
| STO | spherical | infinity | 0.1385 | | 0.0000 |
| S5 | aspheric | 3.8564 | 1.0792 | 1.54/55.8 | -152.2394 |
| S6 | aspheric | -0.6919 | 0.1000 | | -1.0021 |
| S7 | spherical | infinity | 0.7000 | 1.52/64.2 | 0.0000 |
| S8 | spherical | infinity | 0.8843 | | 0.0000 |
| S9 | spherical | infinity | — | | 0.0000 |

Embodiment 4

Figure 16:
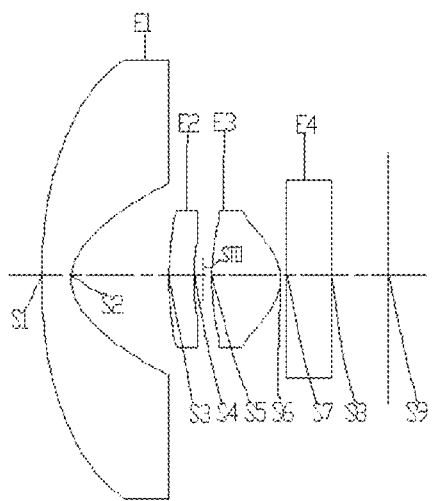
FIG. 16 is a schematic view showing an interactive lens assembly according to Embodiment 4 of the present disclosure.
Figure 17:
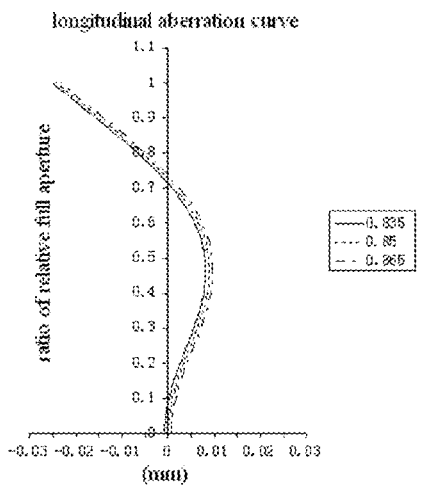
FIG. 17 is a diagram showing a longitudinal aberration curve (mm) of the interactive lens assembly in Embodiment 4.
Figure 18:
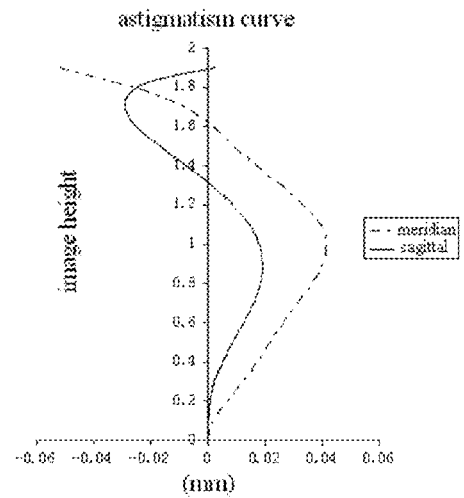
FIG. 18 is a diagram showing an astigmatism curve (mm) of the interactive lens assembly in Embodiment 4.
Figure 19:
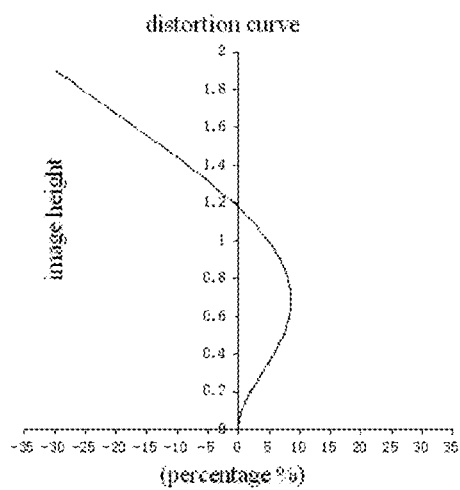
FIG. 19 is a diagram showing a distortion curve (%) of the interactive lens assembly in Embodiment 4.
Figure 20:
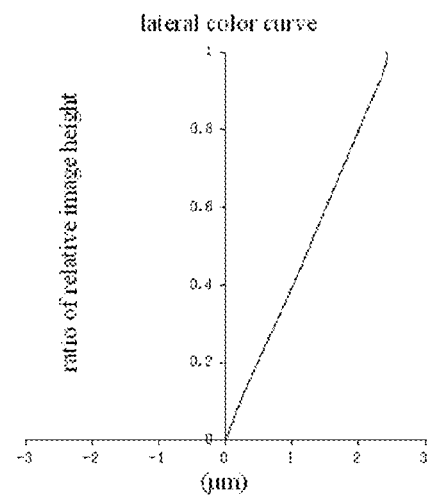
FIG. 20 is a diagram showing a lateral color curve (μm) of the interactive lens assembly in Embodiment 4.

With reference to FIG. 16, in Embodiment 4, the interactive lens assembly meets the conditions of the following tables:

TABLE 8

| No. of surface | A4 | A6 | A8 | A10 | A12 | A14 | A16 |
|---|---|---|---|---|---|---|---|
| S1 | 5.5645E-04 | 6.5153E-05 | -4.3380E-07 | -1.6495E-07 | 3.8382E-09 | -2.6853E-10 | 1.0077E-10 |
| S2 | -6.4495E-03 | 4.8821E-03 | 8.9068E-04 | 2.5069E-04 | 1.5303E-04 | 1.9289E-05 | -3.7174E-05 |
| S3 | -3.5601E-02 | 8.5388E-02 | 3.0451E-02 | -2.4514E-02 | -4.5399E-02 | 1.4226E-02 | 1.1861E-02 |
| S4 | -1.6897E-02 | 1.0800E+00 | -6.0663E-01 | -1.1449E+00 | -3.7749E+00 | 7.4313E+00 | 6.3848E+00 |
| S5 | 1.4657E-01 | -7.7172E-02 | -1.5012E-02 | 4.3981E-02 | 1.1482E-02 | 7.2007E-04 | -2.9274E-02 |
| S6 | 4.9340E-02 | 6.2772E-02 | 1.9269E-02 | 2.5479E-02 | 1.4050E-02 | 2.0897E-03 | -2.0210E-02 |

In addition, f1=−1.39 mm; f2=8.53 mm; f3=1.21 mm; and f=0.60 mm; HFOV=77.6°; Fno: 2.0.

Embodiment 5

Figure 21:
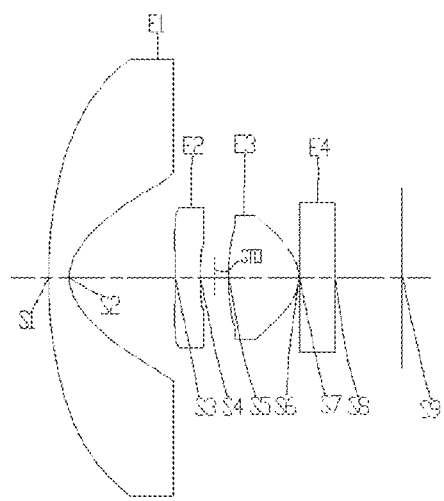
FIG. 21 is a schematic view showing an interactive lens assembly according to Embodiment 5 of the present disclosure.
Figure 22:
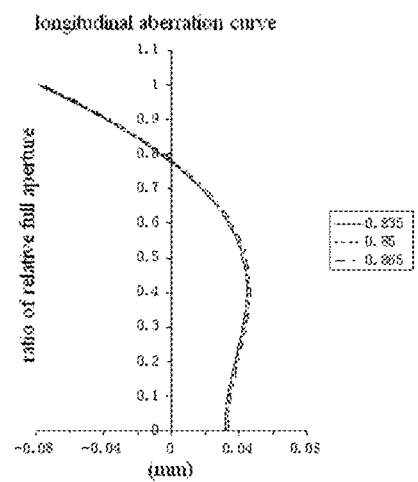
FIG. 22 is a diagram showing a longitudinal aberration curve (mm) of the interactive lens assembly in Embodiment 5.
Figure 23:
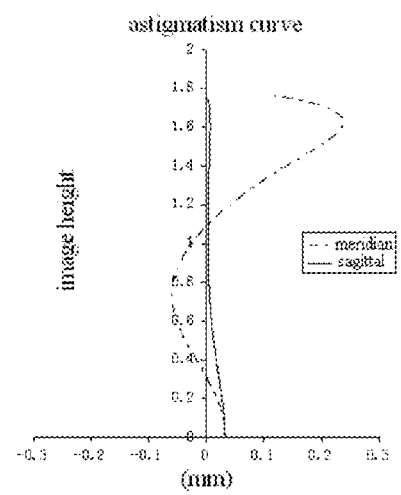
FIG. 23 is a diagram showing an astigmatism curve (mm) of the interactive lens assembly in Embodiment 5.
Figure 24:
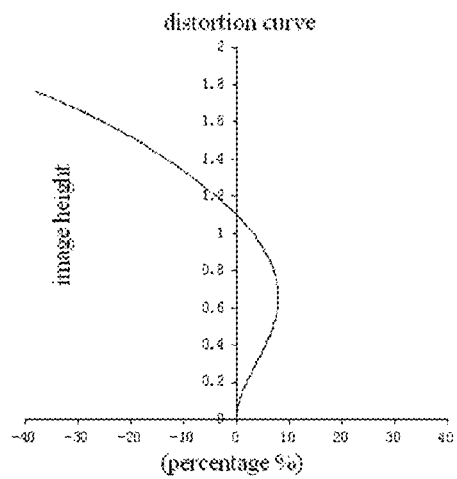
FIG. 24 is a diagram showing a distortion curve (%) of the interactive lens assembly in Embodiment 5.
Figure 25:
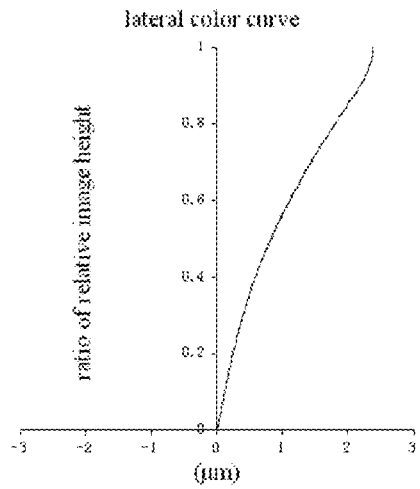
FIG. 25 is a diagram showing a lateral color curve (μm) of the interactive lens assembly in Embodiment 5.

With reference to FIG. 21, in Embodiment 5, the interactive lens assembly meets the conditions of the following tables:

TABLE 9

| No. of surface | Surface type | Curvature radius | Thickness | Material (Refractive Index/Abbe number) | Conic coefficient |
|---|---|---|---|---|---|
| obj | spherical | infinity | infinity | | 0.0000 |
| S1 | aspheric | 10.2724 | 0.4110 | 1.54/55.8 | 3.1606 |

TABLE 9-continued

| No. of surface | Surface type | Curvature radius | Thickness | Material (Refractive Index/Abbe number) | Conic coefficient |
|---|---|---|---|---|---|
| S2 | aspheric | 0.8621 | 2.1098 | | −1.1630 |
| S3 | aspheric | −18.2724 | 0.4905 | 1.54/55.8 | −47.5863 |
| S4 | aspheric | 7.0447 | 0.2831 | | 55.7514 |
| STO | spherical | infinity | 0.2785 | | 0.0000 |
| S5 | aspheric | 2.9665 | 1.3957 | 1.54/55.8 | −100.2601 |
| S6 | aspheric | −0.8339 | 0.0199 | | −0.9461 |
| S7 | spherical | infinity | 0.7000 | 1.52/64.2 | 0.0000 |
| S8 | spherical | infinity | 1.3469 | | 0.0000 |
| S9 | spherical | infinity | — | | 0.0000 |

TABLE 10

| No. of surface | A4 | A6 | A8 | A10 | A12 | A14 | A16 |
|---|---|---|---|---|---|---|---|
| S1 | 4.4450E−04 | 2.7361E−05 | 9.9732E−08 | −1.2008E−08 | 3.0228E−10 | −6.3990E−12 | 1.8822E−12 |
| S2 | −2.4073E−03 | 1.4741E−03 | 9.7528E−05 | −7.9079E−07 | 1.9177E−06 | −1.0272E−06 | −8.7126E−07 |
| S3 | −1.4049E−02 | 2.6246E−02 | 4.5107E−03 | −3.2281E−03 | −3.5340E−03 | 3.7407E−04 | 7.6039E−04 |
| S4 | 4.3454E−02 | 2.9785E−01 | −1.7608E−01 | −1.8231E−01 | 1.6221E−01 | 1.1797E+00 | 5.2852E−01 |
| S5 | 6.4711E−02 | −2.1577E−02 | −3.6183E−03 | 3.9748E−03 | 1.0971E−03 | 8.1160E−04 | −6.6417E−04 |
| S6 | 1.0233E−02 | 7.3147E−03 | 1.6488E−03 | 2.5659E−03 | 1.2045E−03 | 3.8163E−04 | −2.1498E−04 |

In addition, f1=−1.81 mm; f2=−9.57 mm; f3=1.41 mm; and f=0.61 mm; HFOV=78.0°; Fno: 2.0.

Embodiment 6

Figure 26:
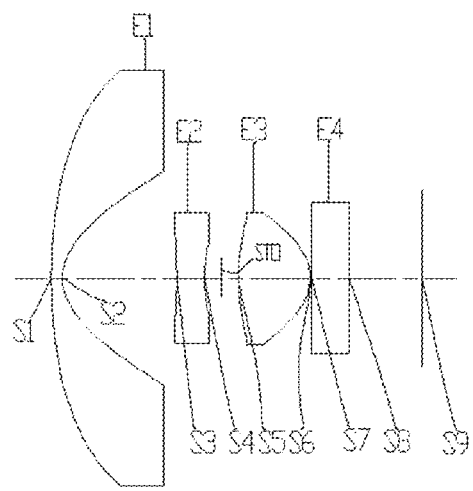
FIG. 26 is a schematic view showing an interactive lens assembly according to Embodiment 6 of the present disclosure.
Figure 27:
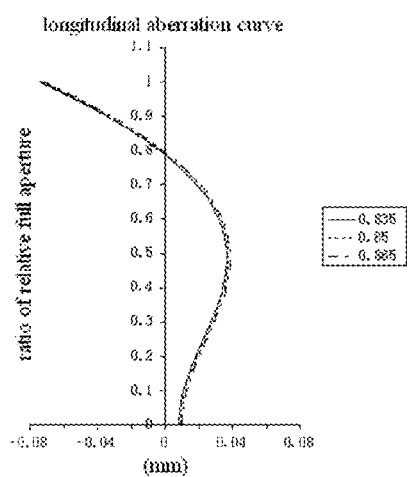
FIG. 27 is a diagram showing a longitudinal aberration curve (mm) of the interactive lens assembly in Embodiment 6.
Figure 28:
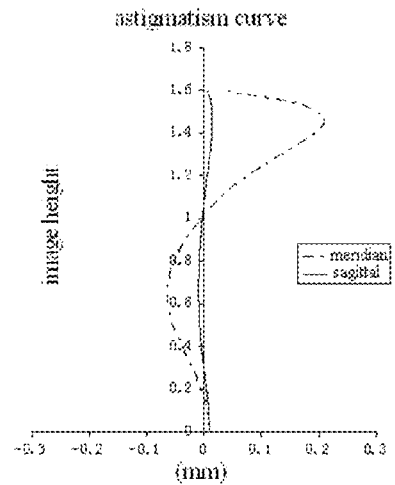
FIG. 28 is a diagram showing an astigmatism curve (mm) of the interactive lens assembly in Embodiment 6.
Figure 29:
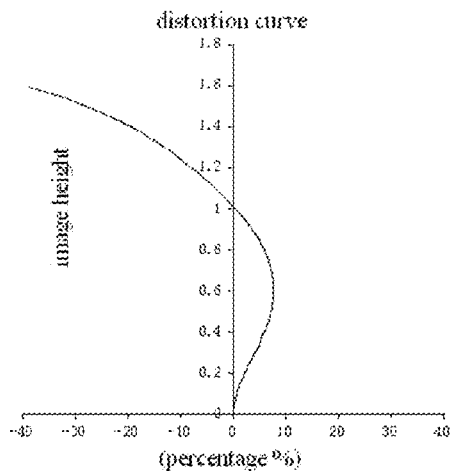
FIG. 29 is a diagram showing a distortion curve (%) of the interactive lens assembly in Embodiment 6.
Figure 30:
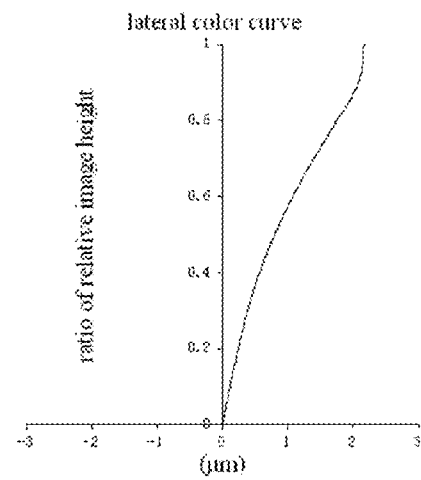
FIG. 30 is a diagram showing a lateral color curve (μm) of the interactive lens assembly in Embodiment 6.

With reference to FIG. 26, in Embodiment 6, the interactive lens assembly meets the conditions of the following tables:

TABLE 11

| No. of surface | Surface type | Curvature radius | Thickness | Material (Refractive Index/Abbe number) | Conic coefficient |
|---|---|---|---|---|---|
| obj | spherical | infinity | infinity | | 0.0000 |
| S1 | aspheric | 9.9544 | 0.2024 | 1.54/55.8 | 3.3434 |
| S2 | aspheric | 0.8714 | 2.1278 | | −1.1757 |
| S3 | aspheric | −6.5581 | 0.5130 | 1.54/55.8 | −90.3400 |
| S4 | aspheric | 5.0852 | 0.3123 | | 53.3748 |
| STO | spherical | infinity | 0.3099 | | 0.0000 |
| S5 | aspheric | 2.5186 | 1.3431 | 1.54/55.8 | −80.6542 |
| S6 | aspheric | −0.8155 | 0.0196 | | −0.9419 |
| S7 | spherical | infinity | 0.7000 | 1.52/64.2 | 0.0000 |
| S8 | spherical | infinity | 1.3469 | | 0.0000 |
| S9 | spherical | infinity | — | | 0.0000 |

TABLE 12

| No. of surface | A4 | A6 | A8 | A10 | A12 | A14 | A16 |
|---|---|---|---|---|---|---|---|
| S1 | 8.4314E−04 | 4.5533E−05 | 2.7799E−07 | −1.0255E−08 | 2.6690E−10 | −1.2588E−11 | 1.3355E−12 |
| S2 | −3.6587E−03 | 1.0680E−03 | 7.9410E−05 | −1.1969E−06 | 2.3772E−06 | −8.2671E−07 | −8.1972E−07 |
| S3 | −1.3163E−02 | 2.6306E−02 | 4.4145E−03 | −3.3348E−03 | −3.6112E−03 | 3.2762E−04 | 7.3514E−04 |
| S4 | 5.4157E−02 | 2.8795E−01 | −1.9077E−01 | −1.8342E−01 | 2.0108E−01 | 1.2524E+00 | 4.7235E−01 |
| S5 | 6.3999E−02 | −2.2288E−02 | −3.9234E−03 | 3.9267E−03 | 1.1521E−03 | 8.7763E−04 | −6.3182E−04 |
| S6 | 7.0639E−03 | 5.4517E−03 | 1.3604E−03 | 2.7101E−03 | 1.3594E−03 | 4.8310E−04 | −1.5903E−04 |

In addition, f1=−1.82 mm; f2=−5.35 mm; f3=1.36 mm; and f=0.56 mm; HFOV=78.0°; Fno: 2.0.

Embodiment 7

Figure 31:
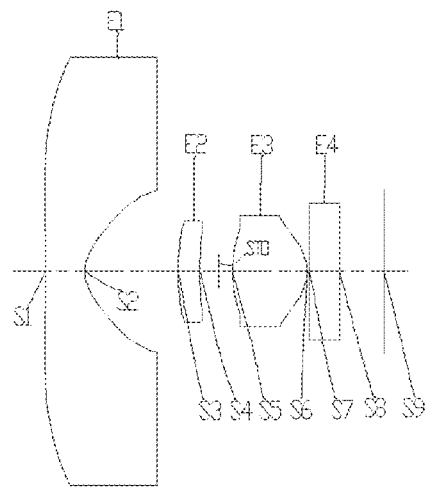
FIG. 31 is a schematic view showing an interactive lens assembly according to Embodiment 7 of the present disclosure.
Figure 32:
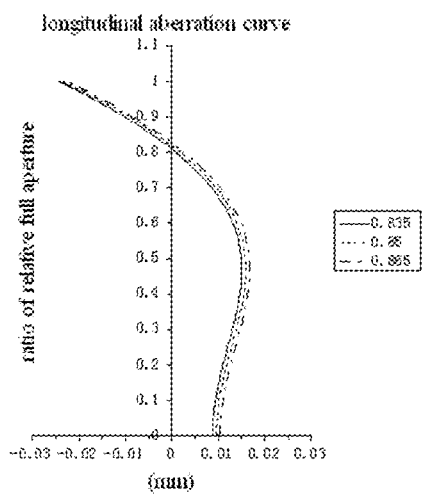
FIG. 32 is a diagram showing a longitudinal aberration curve (mm) of the interactive lens assembly in Embodiment 7.
Figure 33:
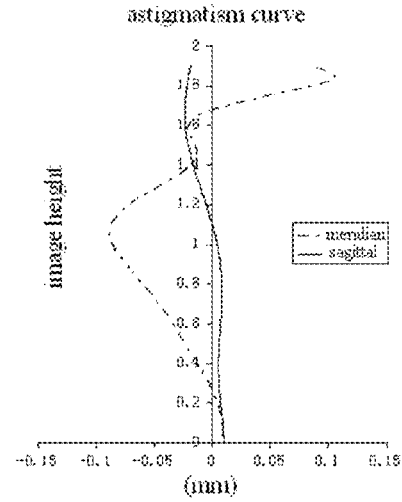
FIG. 33 is a diagram showing an astigmatism curve (mm) of the interactive lens assembly in Embodiment 7.
Figure 34:
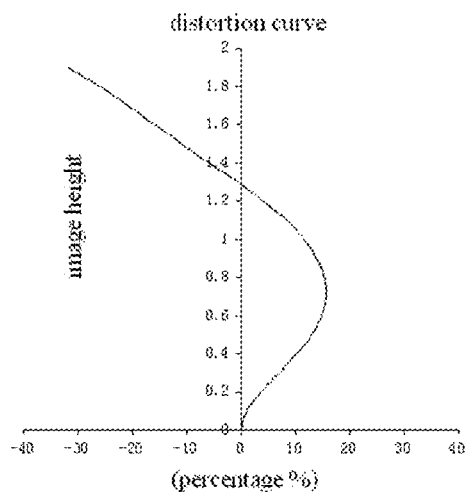
FIG. 34 is a diagram showing a distortion curve (%) of the interactive lens assembly in Embodiment 7.
Figure 35:
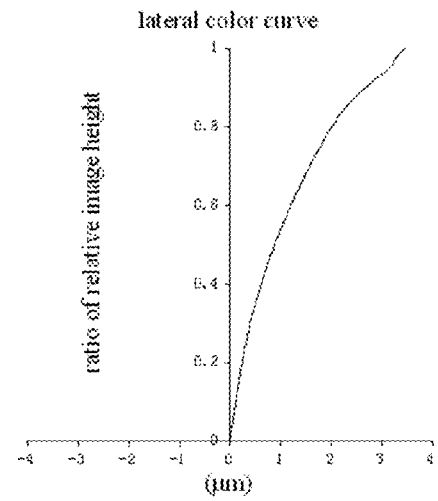
FIG. 35 is a diagram showing a lateral color curve (μm) of the interactive lens assembly in Embodiment 7.

With reference to FIG. 31, in Embodiment 7, the interactive lens assembly meets the conditions of the following tables:

TABLE 13

| No. of surface | Surface type | Curvature radius | Thickness | Material (Refractive Index/ Abbe number) | Conic coefficient |
|---|---|---|---|---|---|
| obj | spherical | infinity | infinity | | 0.0000 |
| S1 | aspheric | −53.0932 | 0.9184 | 1.54/55.8 | −99.7420 |

TABLE 13-continued

| No. of surface | Surface type | Curvature radius | Thickness | Material (Refractive Index/ Abbe number) | Conic coefficient |
|---|---|---|---|---|---|
| S2 | aspheric | 0.8459 | 2.1897 | | −1.6482 |
| S3 | aspheric | 3.8891 | 0.5068 | 1.54/55.8 | −113.6761 |
| S4 | aspheric | 13.8735 | 0.4451 | | −205.1253 |
| STO | spherical | infinity | 0.3246 | | 0.0000 |
| S5 | aspheric | 2.7085 | 1.7456 | 1.54/55.8 | −33.4843 |
| S6 | aspheric | −0.9061 | 0.0557 | | −1.2266 |
| S7 | spherical | infinity | 0.7000 | 1.52/64.2 | 0.0000 |
| S8 | spherical | infinity | 1.0440 | | 0.0000 |
| S9 | spherical | infinity | — | | 0.0000 |

TABLE 14

| No. of surface | A4 | A6 | A8 | A10 | A12 | A14 | A16 |
|---|---|---|---|---|---|---|---|
| S1 | 1.2281E−03 | 9.2772E−06 | −6.7166E−08 | −1.1964E−08 | 1.8613E−10 | −2.5172E−11 | 7.3689E−13 |
| S2 | −9.4755E−03 | 2.8386E−03 | 1.2901E−04 | 1.8473E−05 | 3.2402E−05 | 1.3390E−05 | 3.0457E−06 |
| S3 | −3.7621E−03 | 2.8635E−02 | 6.0321E−03 | −2.2114E−03 | −2.5798E−03 | 5.1553E−04 | 2.5890E−04 |
| S4 | −5.6722E−02 | 2.4213E−01 | −9.1421E−02 | −4.6334E−02 | −1.3934E−01 | 2.6395E−01 | −7.0309E−02 |
| S5 | 7.9792E−02 | −1.7617E−02 | −2.8022E−03 | 2.4229E−03 | −1.4207E−03 | −9.1615E−04 | 2.4804E−03 |
| S6 | 4.2193E−02 | 7.4427E−03 | 1.2352E−05 | 1.9884E−03 | 9.1591E−04 | 2.2846E−04 | −3.0263E−04 |

In addition, f1=−1.57 mm; f2=10.07 mm; f3=1.54 mm; and f=0.59 mm; HFOV=78.0°; Fno: 2.0.

Embodiment 8

Figure 36:
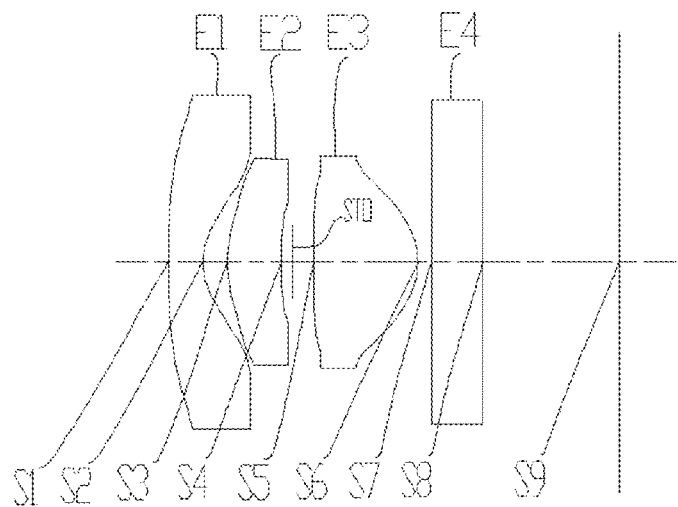
FIG. 36 is a schematic view showing an interactive lens assembly according to Embodiment 8 of the present disclosure.
Figure 37:
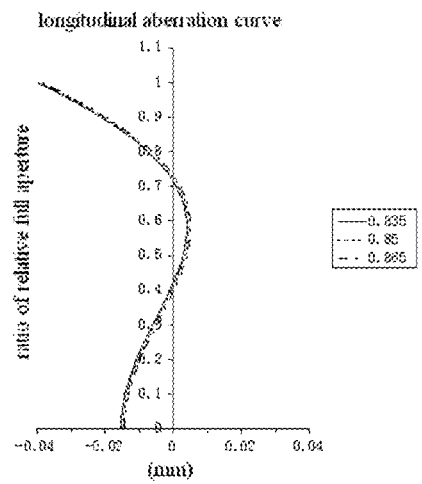
FIG. 37 is a diagram showing a longitudinal aberration curve (mm) of the interactive lens assembly in Embodiment 8.
Figure 38:
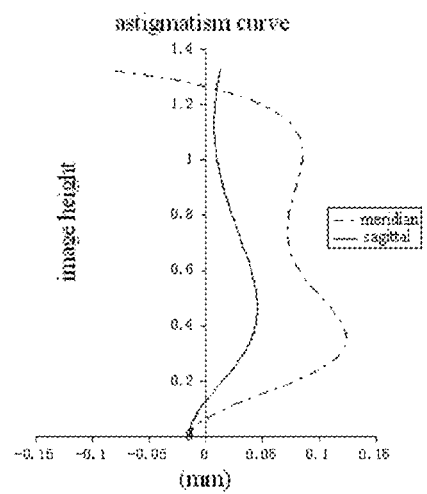
FIG. 38 is a diagram showing an astigmatism curve (mm) of the interactive lens assembly in Embodiment 8.
Figure 39:
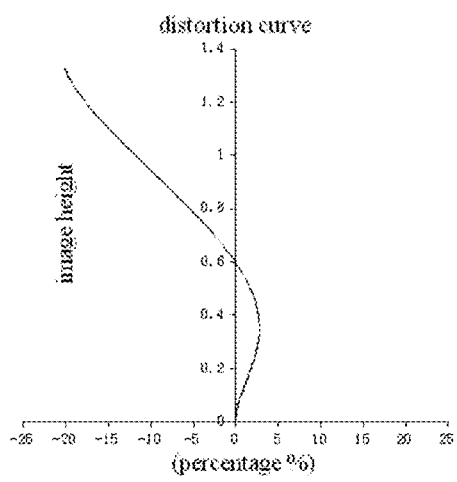
FIG. 39 is a diagram showing a distortion curve (%) of the interactive lens assembly in Embodiment 8.
Figure 40:
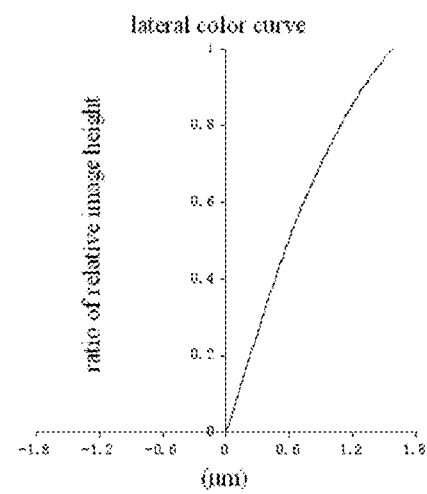
FIG. 40 is a diagram showing a lateral color curve (μm) of the interactive lens assembly in Embodiment 8.

With reference to FIG. 36, in Embodiment 8, the interactive lens assembly meets the conditions of the following tables:

TABLE 15

| No. of surface | Surface type | Curvature radius | Thickness | Material (Refractive Index/ Abbe number) | Conic coefficient |
|---|---|---|---|---|---|
| obj | spherical | infinity | 400.0000 | | 0.0000 |
| S1 | aspheric | 5.7806 | 0.2008 | 1.54/55.8 | 14.3504 |
| S2 | aspheric | 0.3596 | 0.1413 | | −1.6283 |
| S3 | aspheric | 0.6116 | 0.3144 | 1.54/55.8 | −6.2584 |
| S4 | aspheric | 3.9009 | 0.0692 | | −114.3758 |
| STO | spherical | infinity | 0.1187 | | 0.0000 |
| S5 | aspheric | −500.0133 | 0.6029 | 1.54/55.8 | −100.0000 |
| S6 | aspheric | −0.4122 | 0.0784 | | −2.9324 |
| S7 | spherical | infinity | 0.3000 | 1.52/64.2 | 0.0000 |
| S8 | spherical | infinity | 0.7916 | | 0.0000 |
| S9 | spherical | infinity | — | | 0.0000 |

TABLE 16

| No. of surface | A4 | A6 | A8 | A10 | A12 | A14 | A16 |
|---|---|---|---|---|---|---|---|
| S1 | 1.3351E−01 | −6.2319E−02 | 1.0927E−02 | −1.2348E−02 | −1.4258E−02 | −1.5180E−02 | 2.3884E−03 |
| S2 | −5.1175E−01 | −8.5519E−01 | −9.0254E−01 | 2.5482E−01 | 3.9116E+00 | 7.2497E+00 | −9.9019E+00 |
| S3 | −9.1281E−01 | 1.9157E+00 | 3.3077E+00 | 2.7899E+00 | −1.6689E+01 | −3.5616E+01 | 2.3779E+01 |
| S4 | 7.4769E−01 | 3.3719E−01 | 1.5694E+02 | −1.1812E+03 | 4.2771E+02 | 1.3582E+05 | −8.8553E+05 |
| S5 | 3.4067E−01 | 1.9422E+00 | −1.0446E+01 | 2.8050E+01 | 7.5927E+01 | −5.8900E+02 | 9.0837E+02 |
| S6 | −2.4621E+00 | 3.7275E+00 | −2.0259E−01 | 2.3268E+00 | 2.7978E+01 | 4.0057E+01 | −1.6014E+02 |

In addition, f1=−0.74 mm; f2=1.33 mm; f3=0.78 mm, and f=0.68 mm; HFOV=67.6°; Fno: 2.1.

Formulas in Embodiments 1 to 8 meet the conditions of the following table, respectively:

| Formulas | Embodiments | | | | | | | |
|---|---|---|---|---|---|---|---|---|
|  | 1 | 2 | 3 | 4 | 5 | 6 | 7 | 8 |
| (CT1 + CT2)/CT3 | 0.85 | 0.76 | 0.81 | 0.79 | 0.65 | 0.53 | 0.82 | 0.85 |
| ImgH/(f*TTL) | 0.77 | 0.50 | 0.45 | 0.59 | 0.41 | 0.42 | 0.4 | 0.75 |
| HFOV | 72.0° | 74.1° | 78° | 77.6° | 78° | 78° | 78° | 68.6° |
| f12/f3 | −2.46 | −2.07 | −1.70 | −1.68 | −0.9 | −0.76 | −1.59 | −2.51 |
| SAG32/SD32 | −0.55 | −0.54 | −0.57 | −0.57 | −0.69 | −0.71 | −0.5 | −0.58 |
| R2/R6 | −0.84 | −0.82 | −0.95 | −0.94 | −1.03 | −1.07 | −0.93 | −0.87 |
| f1/f | −1.06 | −1.20 | −2.32 | −2.33 | −2.97 | −3.28 | −2.65 | −1.08 |
| (T12 + T23)/Dr1r6 | 0.23 | 0.21 | 0.48 | 0.48 | 0.54 | 0.57 | 0.48 | 0.23 |

Although explanatory embodiments and principle of the present disclosure have been described for the interactive lens assembly, with the teaching described above of the present disclosure, various amendments and modifications can be made by those skilled in the art based on the embodiments described above, within in the scope of the disclosure. Those skilled in the art should understand that the detailed description above is only for illustrative purposes of the present disclosure and are not intended to limit the present disclosure. The scope of the present disclosure is defined by the claims and the like.

What is claimed is:

1. An interactive lens assembly, comprising a first lens, a second lens, an aperture stop, a third lens and a filter from an object side of the interactive lens assembly to an image side of the interactive lens assembly in turn, wherein
   the first lens is of a negative focal power, an image side surface of the first lens is concave;
   the second lens is of a focal power;
   the third lens is of a positive focal power, an image side surface of the third lens is convex,
   wherein each of the first lens, the second lens and the third lens is made of a plastic material,
   the interactive lens assembly meets the following formulas:

$(CT1+CT2)/CT3<0.9$; and $ImgH/(f*TTL) \geq 0.4$ mm$^{-1}$, wherein CT1 represents a central thickness of the first lens,
   CT2 represents a central thickness of the second lens,
   CT3 represents a central thickness of the third lens,
   ImgH represents half of a length of an effective pixel region diagonal of the interactive lens assembly at an imaging surface,
   f represents an effective focal length of the interactive lens assembly, and
   TTL represents a full length of the interactive lens assembly.

2. The interactive lens assembly according to claim 1, wherein the filter is a band pass filter, and a band pass wavelength is between a wavelength of light source used ±15 nm and the wavelength of light source used ±50 nm.

3. The interactive lens assembly according to claim 2, wherein an object side surface of the first lens is convex.

4. The interactive lens assembly according to claim 1, wherein the interactive lens assembly meets the following formula:

$HFOV>65°$, wherein HFOV represents half of a maximum field angle of the interactive lens assembly.

5. The interactive lens assembly according to claim 4, wherein an object side surface of the first lens is convex.

6. The interactive lens assembly according to claim 1, wherein the interactive lens assembly meets the following formula:

$-3.5<f1/f<-1$, wherein f1 represents a focal length of the first lens.

7. The interactive lens assembly according to claim 6, wherein an object side surface of the first lens is convex.

8. The interactive lens assembly according to claim 1, wherein the interactive lens assembly meets the following formula:

$0.2<(T12+T23)/Dr1r6<0.6$, wherein T12 represents a distance between the first lens and the second lens along an optic axis,
   T23 represents a distance between the second lens and the third lens along the optic axis, and
   Dr1r6 represents a distance from an object side surface of the first lens to the image side surface of the third lens.

9. The interactive lens assembly according to claim 8, wherein an object side surface of the first lens is convex.

10. The interactive lens assembly according to claim 1, wherein the interactive lens assembly meets the following formulas:

$-1.3<R2/R6<-0.7$; and $-0.8<SAG32/SD32<-0.4$, wherein R2 represents a curvature radius of the image side surface of the first lens,
    R6 represents a curvature radius of the image side surface of the third lens,
    SAG32 represents a vector height of the image side surface of the third lens, and
    SD32 represents a maximum effective radius of the image side surface of the third lens.

11. The interactive lens assembly according to claim 10, wherein an object side surface of the first lens is convex.

12. The interactive lens assembly according to claim 10, wherein the interactive lens assembly meets the following formula:

$-2.6<f12/f3<-0.7$, wherein f12 represents a combined focal length of the first lens and the second lens, and
    f3 represents a focal length of the third lens.

13. The interactive lens assembly according to claim 12, wherein an object side surface of the first lens is convex.

14. The interactive lens assembly according to claim 1, wherein an object side surface of the first lens is convex.

15. The interactive lens assembly according to claim 14, wherein the second lens is of a positive focal power, an object side surface of the second lens is convex, and an image side surface of the second lens is concave.

16. The interactive lens assembly according to claim 15, wherein an object side surface of the third lens is convex.

\* \* \* \* \*